---

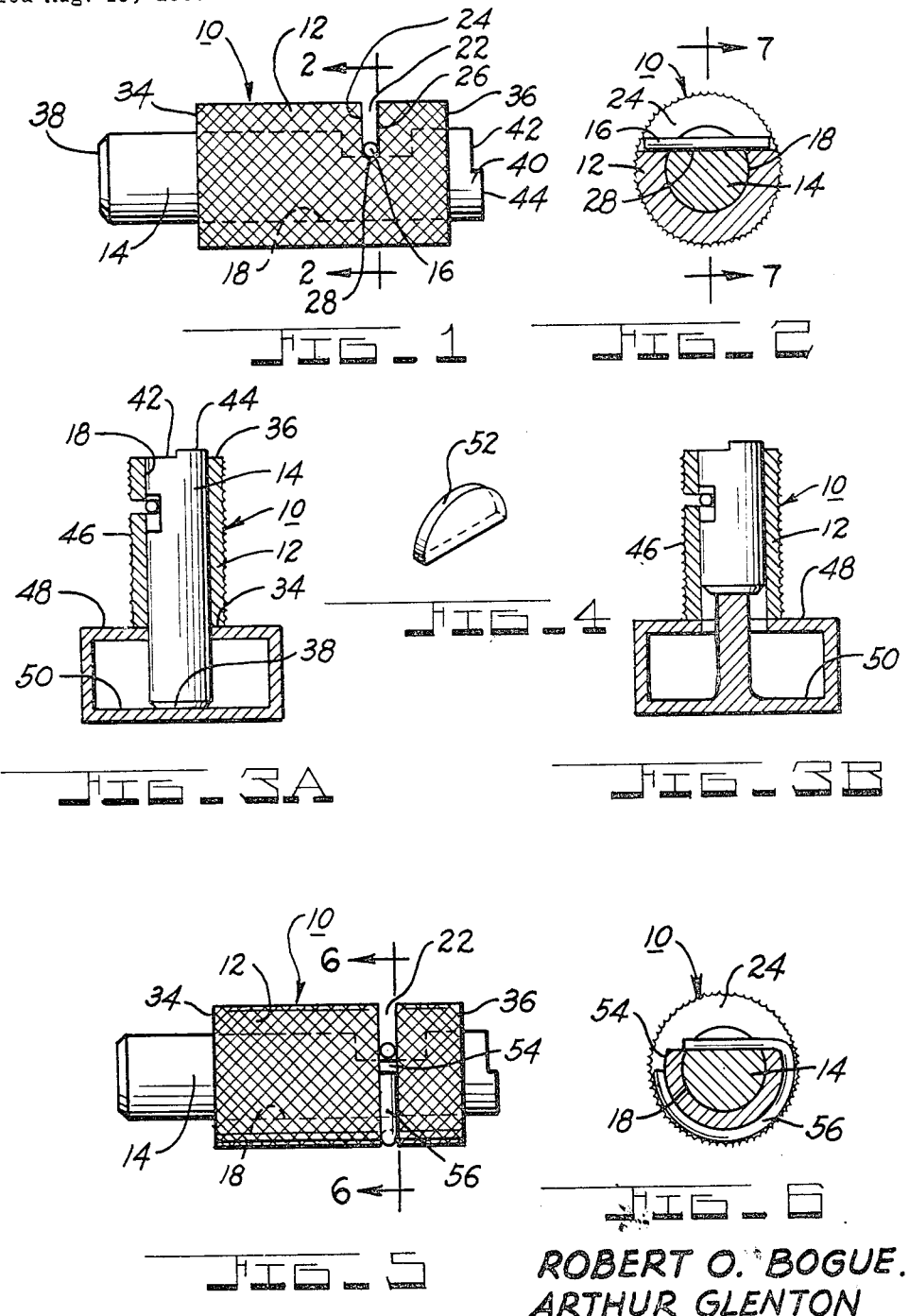
March 31, 1970 — R. O. BOGUE ET AL — 3,503,133
GAGE FASTENING DEVICE
Filed Aug. 15, 1968 — 2 Sheets-Sheet 1
ROBERT O. BOGUE.
ARTHUR GLENTON
INVENTORS.
BY
Plante, Arens, Hartz and O'Brien
ATTORNEYS March 31, 1970     R. O. BOGUE ET AL     3,503,133
GAGE FASTENING DEVICE
Filed Aug. 15, 1968     2 Sheets-Sheet 2
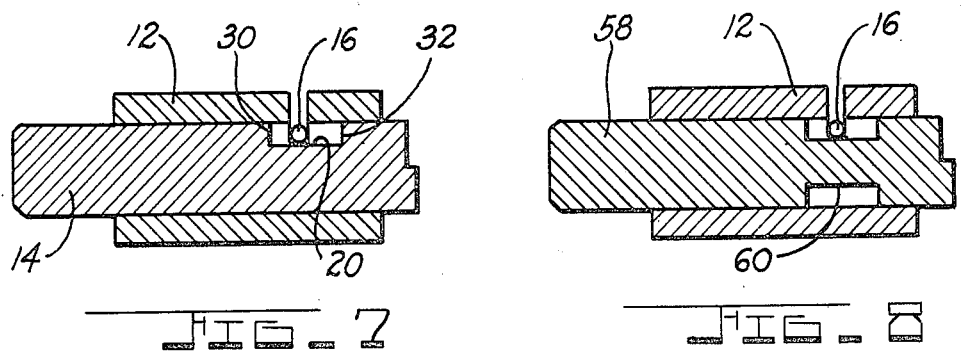
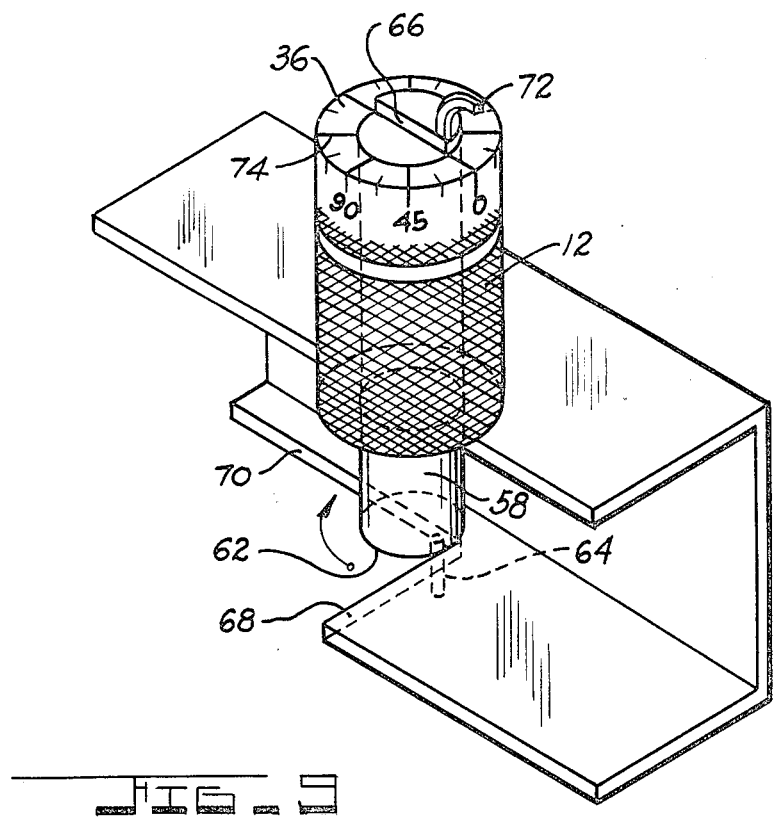
ROBERT O. BOGUE.
ARTHUR GLENTON
                INVENTORS
BY
Plante, Arens, Hartz and O'Brien
                ATTORNEYS

United States Patent Office 3,503,133
Patented Mar. 31, 1970

3,503,133
GAGE FASTENING DEVICE
Robert O. Bogue and Arthur Glenton, South Bend, Ind., assignors to The Bendix Corporation, a corporation of Delaware
Filed Aug. 15, 1968, Ser. No. 752,859
Int. Cl. G01b 3/28
U.S. Cl. 33—169                                    1 Claim

ABSTRACT OF THE DISCLOSURE

A gage fastening device having a body with an axial bore therein and a transverse opening intersecting said axial bore. A retaining means operatively engages said transverse opening and projects into said axial bore. A shaft means having thereon a transverse slot is slidably disposed in said axial bore with said transverse slot providing for axial engagement with said retaining means thereby providing for predetermined axial movement of said shaft means with respect to said body.

BACKGROUND OF THE INVENTION

The invention concerns an improvement to fastening techniques used in association with conventional barrel-type bobber gages. However, it is felt that the invention may be used for any application where it is desirable to limit or contain the axial movement of a shaft with respect to another member.

The conventional barrel-type bobber gages in wide use throughout industry and with which we are familiar consist mainly of bulky, large diameter body or sleeve means slidably retaining therein a shaft means having a slot thereon for cooperation with a set screw mounted in said body means to provide for limited axial movement of the shaft means. These conventional bobber gages employ thick walls to provide sufficient material with which to retain the set screw. The wall thickness of the bobber gage precludes its use in close quarters where sufficient area is unavailable on which to place the end of the body member which is the reference surface against which height and depth measurements are made. Moreover, if sufficient material is left on the body in the area of the set screw and the remainder of the body is machined away to allow its use in close quarters, the cost of the bobber gage becomes prohibitively expensive.

SUMMARY OF THE INVENTION

It is the purpose of this invention to provide a barrel-type bobber gage whose body or barrel is sufficiently small enough to allow its use where space is not available to use the conventional devices.

It is another object of this invention to provide a retaining or fastening technique that will satisfactorily cooperate with a reduced diameter body or barrel means.

It is still another object of this invention to effect a substantial cost savings in association with the manufacturing of said barrel-type bobber gages.

Other objects and features of the invention will be apparent from the following description of the gage fastening device taken in connection with the accompanying drawings.

BRIEF DESCRIPTION OF THE DRAWINGS

FIGURE 1 is a side view of a barrel-type bobber gage embodying the preferred fastening devices;
FIGURE 2 is a sectional view taken along line 2—2 of FIGURE 1;
FIGURE 3A is a view, partially sectioned, of a bobber gage being used to measure the depth between two surfaces;
FIGURE 3B is a view, partially sectioned, of a bobber gage being used to measure the height between two surfaces;
FIGURE 4 is a perspective view of a modified form of the retaining means shown in FIGURE 2;
FIGURE 5 is a modified form of the bobber gage shown in FIGURE 1;
FIGURE 6 is a sectional view taken along line 6—6 of FIGURE 5;
FIGURE 7 is a sectional view taken along line 7—7 of FIGURE 2;
FIGURE 8 is a modified form of the shaft means shown in FIGURE 7; and
FIGURE 9 is a view of a modified form of the bobber gage being used to measure the distance between two surfaces and relative angular position thereof.

DESCRIPTION OF THE PREFERRED EMBODIMENT

Referring now to the drawings and particularly to FIGURE 1, illustrating the preferred embodiment of the invention, a barrel-type bobber gage is indicated by reference numeral 10 and is comprised of a body or barrel 12, a shaft means 14 and a retaining means 16.

The body 12 has a bore 18 for slidably receiving said shaft means 14. The shaft means 14 has thereon a transverse slot 20, as best shown in FIGURE 7. The body or barrel 12 has a transverse opening or slot 22 for receiving the retaining means or pin 16. The diameter of pin 16 is predetermined so as to firmly frictionally engage slot walls 24 and 26. Pin 16 abuts slot bottom 28 the depth of which is predetermined with respect to transverse slot 20 to facilitate free sliding action between the pin 16 and transverse slot 20. Referring briefly to FIGURE 7, it can be seen that the shaft means 14 is axially free to slide relative to the pin 16 until either slot end 30 or 32 of the slot 20 engages the pin 16.

Referring again to FIGURE 1, the body or barrel 12 has ends 34 and 36 which are finished surfaces in a radial plane. Shaft means 14 has shaft ends 38 and 40. Shaft end 38 is a finished surface in a radial plane for cooperation with end 34 of body 12 for measuring the depth of one surface relative to another. Shaft end 40 has parallel surfaces 42 and 44 which represent respectively the minimum and maximum tolerances of acceptability of the gage. Thus, for the gage to indicate acceptability of any given measurement, body end 36 must be even with or between parallel surfaces 42 and 44.

Referring now to FIGURE 3, FIGURE 3A shows the bobber gage making a depth measurement while FIGURE 3B shows a modified form of the bobber gage making a height measurement. It is noted that the outer periphery 46 of the body 12 is shown as a knurled surface to permit improved gripping of the body by the gage operator since the use of this type gage is generally a hand operation.

The subject matter of this invention is particularly valuable to the art, since it has been found that the gage disclosed herein can be manufactured at a cost of approximately forty percent less than other gages of the same type now available.

MODE OF OPERATION OF THE PREFERRED EMBODIMENT

Referring now to FIGURE 3A, it is assumed that the bobber gage 10 is operated manually to take a depth measurement of surface 50 relative to surface 48. In taking the measurement, end 34 of the body 12 would be placed firmly against surface 48 and since shaft means 14 is free to slide within the body 12, end 38 of the shaft means 14 will either drop so as to engage surface 50, or move up into the bore 18 allowing surfaces 38 and 34 to engage surfaces 50 and 48, respectively. The operator will then visually note the relationship of the parallel surfaces 42 and 44 with respect to end 36 of the body 12. If surface 36 of body 12 is even with either parallel surface 42 or 44, or between parallel surfaces 42 and 44, the depth being measured is acceptable. As will be seen by those skilled in the art, the distances between end 38 and parallel surfaces 42 and 44 are predetermined as a function of the distance to be measured between end 38 and end 34. As will be further seen by those skilled in the art, if a height measurement, as depicted in FIGURE 3B, is being measured, the identical acceptability criterion exists.

DESCRIPTION OF THE MODIFIED EMBODIMENTS

In the modified embodiments shown in FIGURES 4, 5, 6, 8, and 9, those parts which are identical to corresponding parts of the preferred embodiment, depicted in FIGURE 1, will be given the same identifying numbers.

With reference now to FIGURE 4, a D-shaped disc-like member 52, is shown as a modified form of the retaining means 16 depicted in FIGURE 2. The D-shaped disc 52 frictionally engages the transverse opening 22 in the same manner as the pin 16. The function of disc 52 is also identical to the function of pin 16.

FIGURES 5 and 6 reflect an alternate type of retaining means. The transverse opening or slot 22 includes an annular groove 54 around the outer periphery of said body 12 which connects with the ends of said slot 22. A substantially D-ring shaped resilient member 56 is suitably expanded and then installed in said slot 22 and groove 54 so as to have its flat portion positioned to protrude into said bore 18. D-ring member 56 frictionally grips and engages body 12 to retain itself in place. The functional relationship between D-ring member 56 and said body 12 with respect to shaft means 14 and its transverse slot 20 remains the same as stated in the preferred embodiment for the retaining means or pin 16.

With reference now to FIGURES 8 and 9, a modified form of the shaft means shown in FIGURES 1 and 7 is depicted to allow for rotational movement thereof. A shaft means 58 is provided with an annular slot or groove 60 so that said shaft means 58 is free to rotate with respect to body 12. End 62 of shaft means 58 has thereon a raised portion 64 which is radially aligned with a surface 66 which axially joins parallel surfaces 42 and 44. The shaft end 62 cooperates with end 34 of body 12 in the manner explained above when measuring the depth of one surface relative to another. As shown in FIGURE 9, the raised portion 64 on the end 62 of shaft means 58 is free to rotate between edges 68 and 70, in response to the manual rotation of a tab means 72 which is suitably secured to said shaft means 58. Surface 66 and the tab means 72 will, in cooperation with radial markings 74 inscribed on surface 36 of body 12, reflect the angular separation of edges 68 and 70. As may be seen by those skilled in the art, the radial markings may start with 0 and in incremental steps be numbered through and including 360 degrees or be merely inscribed at predetermined increments. If it is desirable to know the exact angular separation of edges 68 and 70, the raised portion 64 may be placed against edge 68 and the body 12 rotated until the 0 radial marking coincides with surface 66 and the tab means 72, and then the tab 72 moved so as to engage the raised portion 64 with edge 70; thus, surface 66 will then be aligned with a radial marking which identifies the total angular separation.

The remainder of the mode of operation of this modified form of the bobber gage is identical to the preferred embodiment shown in FIGURE 1 and needs no further description of operation.

While the specific details have been herein shown and described, the invention is not confined thereto, as other substitutes can be made within the spirit and scope of the invention.

We claim:
1. A gage fastening device comprising:
   a body having an axial bore therein;
   said body having a transverse slot passing through said body and said axial bore;
   said transverse slot including an annular groove in the outer periphery of said body connecting with the ends of said slot;
   a retaining means having a circumferential portion and a flat portion, said portions being formed in a generally D-shaped configuration;
   said flat portion and said circumferential portion resiliently engaging said slot and said annular groove, respectively;
   a shaft means slidably disposed in said axial bore; and
   a transverse slot on said shaft means for axial engagement with said flat portion of said retaining means thereby providing for predetermined axial movement of said shaft means with respect to said body.

References Cited

UNITED STATES PATENTS

| | | |
|---|---|---|
| 2,514,794 | 7/1950 | Prince. |
| 2,718,706 | 9/1955 | Kustusch. |
| 2,807,882 | 10/1957 | Lovenston. |
| 3,092,914 | 6/1963 | Buscher. |
| 3,323,546 | 6/1967 | Lord _____ 285—91 X |

OTHER REFERENCES 563,638   9/1958   Canada.

HARRY N. HAROIAN, Primary Examiner